United States Patent
Chretien et al.

(10) Patent No.: US 7,219,822 B2
(45) Date of Patent: May 22, 2007

(54) SHOPPING LIST ORGANIZER

(76) Inventors: Bradly A. Chretien, 424-2440 Old Okanagan Hwy., Westbank, British Columbia (CA) V4T 1X6; Alan Chretien, 424-2440 Old Okanagan Hwy., Westbank, British Columbia (CA) V4T 1X6; Michael Howard Boudreau, 451 20th Street SE., Salmon Arm, British Columbia (CA) V1E 1J4

( * ) Notice: Subject to any disclaimer, the term of this patent is extended or adjusted under 35 U.S.C. 154(b) by 378 days.

(21) Appl. No.: 10/826,759

(22) Filed: Apr. 16, 2004

(65) Prior Publication Data

US 2004/0251289 A1 Dec. 16, 2004

Related U.S. Application Data

(60) Provisional application No. 60/320,113, filed on Apr. 16, 2003.

(51) Int. Cl.
*B60R 7/00* (2006.01)
*B60R 9/00* (2006.01)
*B60R 11/00* (2006.01)

(52) U.S. Cl. ............... 224/411; 224/536; 224/558; 224/570; 224/331

(58) Field of Classification Search ............ 224/411, 224/419, 570, 558, 536, 331
See application file for complete search history.

(56) References Cited

U.S. PATENT DOCUMENTS

| | | | |
|---|---|---|---|
| 3,881,267 A | 5/1975 | Hicks | |
| 3,912,291 A | 10/1975 | Frisch | |
| 3,964,134 A | 6/1976 | Newtson | |
| 4,032,164 A | 6/1977 | Frisch | |
| 4,356,651 A | 11/1982 | Barlow | |
| 4,423,888 A | 1/1984 | Addison | |
| 4,496,058 A | 1/1985 | Harris et al. | |
| 4,685,701 A * | 8/1987 | Amundson et al. | ........... 281/42 |
| 4,848,117 A | 7/1989 | Welborn et al. | |
| 4,858,353 A | 8/1989 | Krebs et al. | |
| 5,086,960 A | 2/1992 | Schwietzer | |
| 5,154,330 A | 10/1992 | Haynes | |
| D331,076 S | 11/1992 | Montgomery | |
| 5,250,789 A | 10/1993 | Johnsen | |
| D355,063 S | 1/1995 | Pirnat | |
| D366,903 S | 2/1996 | Baggott | |
| 6,000,610 A | 12/1999 | Talbott et al. | |
| 6,029,380 A | 2/2000 | Goddard | |
| 6,158,640 A | 12/2000 | Karp et al. | |
| 6,299,119 B1 * | 10/2001 | Dunning | ............... 248/346.03 |

* cited by examiner

*Primary Examiner*—Jes F. Pascua
*Assistant Examiner*—Lester L. Vanterpool
(74) *Attorney, Agent, or Firm*—Anthony C. Edwards

(57) ABSTRACT

A shopping list organizer includes a rigid substantially planar member sized to support a shopping list when the shopping list is mounted thereon. A clamp is provided for releasably mounting the shopping list on a first surface of the planar member. Magnets are mounted on a second side of the planar member, opposite the first side, for releasably mounting the planar member on a flat substrate. At least one clip is hingedly mounted to the second side of the planar member for rotation about the hinge between a closed position substantially flush against the second side of the planar member and an open position substantially orthogonal to the second side of the planar member. In the open position, the clip is disposed for releasably mounting onto an elongate handle.

20 Claims, 9 Drawing Sheets

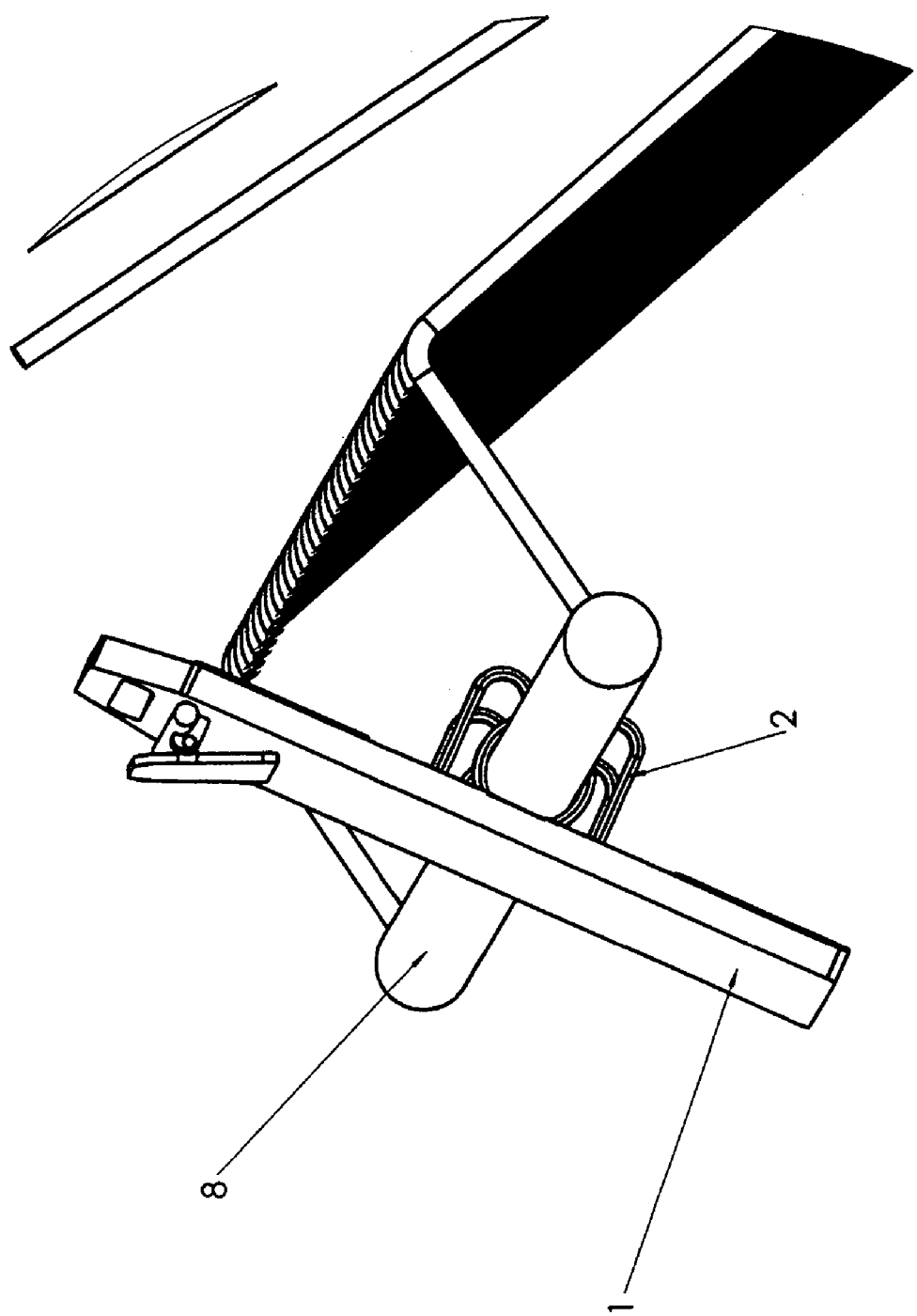
Fig. 4   A (1:2)

B (1 : 6)

SHOPPING LIST ORGANIZER

CROSS REFERENCE TO RELATED APPLICATION

This application claims priority from U.S. Provisional Patent Application No. 60/320,113 filed Apr. 16, 2003 entitled Shopping List Organizer.

FIELD OF THE INVENTION

This invention relates to the field of devices for managing shopping lists while both at home and while in a retail store.

BACKGROUND OF THE INVENTION

Devices for holding shopping lists at home are primarily for securing shopping lists in a known location such as on the fridge; so that the list can be added to as items are depleted. It is an object to provide a shopping list organizer primarily for releasably securing shopping lists on a shopping cart or basket in a position and manner that makes it convenient, stable, and easy to use and write on the list.

It is known that shopping lists can be conveniently attached to shopping carts by either fixed or releasable means to support the shopping process. In particular the applicant is aware of patents, as set out in the following list, which disclose boards or clipboard like devices that releasably attach to shopping cart handles, basket, or side walls. Some of these devices merely keep the clipboard in a fixed known location, while the board can rotate about the mounting point. Other of these devices fix the board in an operating or predominantly horizontal position, while others include a tilt stand type of mechanism.

In particular applicant is aware of the following: U.S. Design Pat. No. 355,063 which issued Jan. 31, 1995 to Pimat for a Display Holder for Grocery Carts; U.S. Design Pat. No. 331,076 which issued Nov. 17, 1992 to Montgomery for a Shopping List Holder; U.S. Desian Pat. No. 366,303 which issued Feb. 6, 1996 to Baggoti for a Coupon and Shopping List Holder; U.S. Pat. No. 3,881,267 which issued May 6, 1975 to Hicks for a Shopping Cart List Holder; U.S. Pat. No. 3,912,291 which issued Oct. 14, 1975 to Frisch for a Shopping Cart Shelf Assembly; U.S. Pat. No. 3,964,134 which issued Jun. 22, 1976 to Newston for a Grocery Cart Clip Attachment; U.S. Pat. No. 4,356,651 which issued Nov. 2, 1982 to Barlow for a Rotatable Note Holder; U.S. Pat. No. 4,423,888 which issued Jan. 3, 1984 to Addison for a Store Cart with Clipboard Item-Retention Means; U.S. Pat. No. 4,496,058 which issued Jan. 29, 1985 to Harris et al. for a Shopping Organizer; U.S. Pat. No. 4,848,117 which issued Jun. 18, 1989 to Welborn et al. for a Shopping Cart List Holder; U.S. Pat. No. 4,858,353 which issued Aug. 22, 1989 to Krebs et al. for a Grocery Shopper Qrganizer; U.S. Pat. No. 5,086,960 which issued Feb. 11, 1992 to Schwietzer for a Grocery Cart Attachment; U.S. Pat. No. 5,154,330 which issued Oct. 13, 1992 to Haynes for a Shopping List Holder and U.S. Pat. No. 6,029,380 which issued Feb. 29, 2000 to Goddard for a Shopping List Holder for Shopping Carts.

SUMMARY OF THE INVENTION

The shopping list organizer of the present invention includes a clip board with a smooth writing surface on one side, and a contoured surface on the second side. Attached to the contoured side of the clip board is mounting means which permit the clipboard to be releasably mounted to a range of shopping cart handles of different size and shape. The mounting means also provides for the clipboard to releasably mount to a flat surface such as a refrigerator or wall. The mounting means allows the user to position the clipboard to a convenient angle and position on the shopping cart handle for optimum viewing and writing.

In one embodiment the mounting means consists of flip out loops made of a resilient or spring-like material such as metal or plastic that engage and hold onto the shopping cart handle.

In summary the shopping list writing tablet and mounting system according to the present invention includes a rigid substantially planar member sized to support a shopping list when the shopping list is mounted thereon. A means is provided for releasably mounting the shopping list on a first surface of the planar member, that is, the surface to be exposed to the user. A second means, mounted on a second side of the planar member, opposite the first side, is provided for releasably mounting the planar member on a flat substrate such as a wall, appliance door, or other residential surface commonly found in a household residence. At least one clip is hingedly mounted by a hinge means to the second side of the planar member for rotation about the hinge between a closed position substantially flush against the second side of the planar member and an open position substantially orthogonal to the second side of the planar member. In the open position, the clip is disposed for releasably mounting onto an elongate handle. In the closed position the clip is retracted so as to not interfere with operation of the means for releasably mounting the planar member on a flat substrate.

Each clip has at least one arm defining an aperture and an opening. The opening cooperates with the aperture for passing of the handle through the opening into the aperture. The aperture is sized to snugly retain the handle journalled in the aperture. A friction member is mounted in cooperation with the aperture when the clip is in the open position so as to bear the friction member against and frictionally engage the handle when the handle is releasably mounted in the aperture.

The means for releasably mounting the shopping list may be a resilient clip mounted to the first side of the planar member. The means for releasably mounting the planar member on a flat substrate may include at least one magnet, for example, a pair of magnets mounted spaced apart on opposite ends of the second side of the planar member, in which case the clip or clips may be hingedly mounted between the pair of magnets. The clips may be a pair of clips mounted so that, in their open position, the apertures on the pair of clips are aligned to accept the handle simultaneously mounted in both apertures. In one embodiment the planar member is elongate between the opposite ends, and the handle, when mounted in the pair of apertures, extends laterally across the planar member.

The clip or clips may be resilient or may otherwise be releasably mountable onto the handle so as to urge the handle against the friction member. For example, each clip may have a pair of opposed facing resilient hook-arms defining the aperture therebetween. The aperture may in one embodiment be substantially circular. The friction member may be mounted to the second side of the planar member so as to dispose at least a frictional bearing surface of the friction member into alignment with the aperture, that is, so as to engage a surface of the handle when the handle is mounted in the aperture.

In one embodiment the aperture has a vertex adjacent the second side of the planar member when the corresponding clip is in the open position. The frictional bearing surface may be adjacent the vertex or otherwise adjacent the rim of the clip around the aperture so as to dispose the bearing surface inwardly into the aperture. Thus, the handle when mounted in the aperture contacts and bears against the frictional bearing surface and not against the corresponding portion of the rim. The friction member may be advantageously resilient in order to increase the surface area in contact with handle, or may otherwise be adapted to frictionally grip the handle by other traction means including, teeth and the like.

In one embodiment the friction member extends between a pair of clips. The friction member may be mounted to the second side of the planar member so as to extend into the clip apertures when the pair of clips are in the closed position.

The second side of the planar member may have recesses therein, formed so that the clip or clips when in the closed position lie in the recesses. In the closed position each clip may be substantially contained within the recesses in the second side of the planar member.

The hinge means may provide for folding of a pair of clips inwardly from adjacent edges of the second side of the planar member.

BRIEF DESCRIPTION OF THE DRAWINGS

FIG. 4 is, in side perspective view, one embodiment of the present invention attached to a shopping cart handle.

DETAILED DESCRIPTION OF EMBODIMENTS OF THE INVENTION

Figure 1:
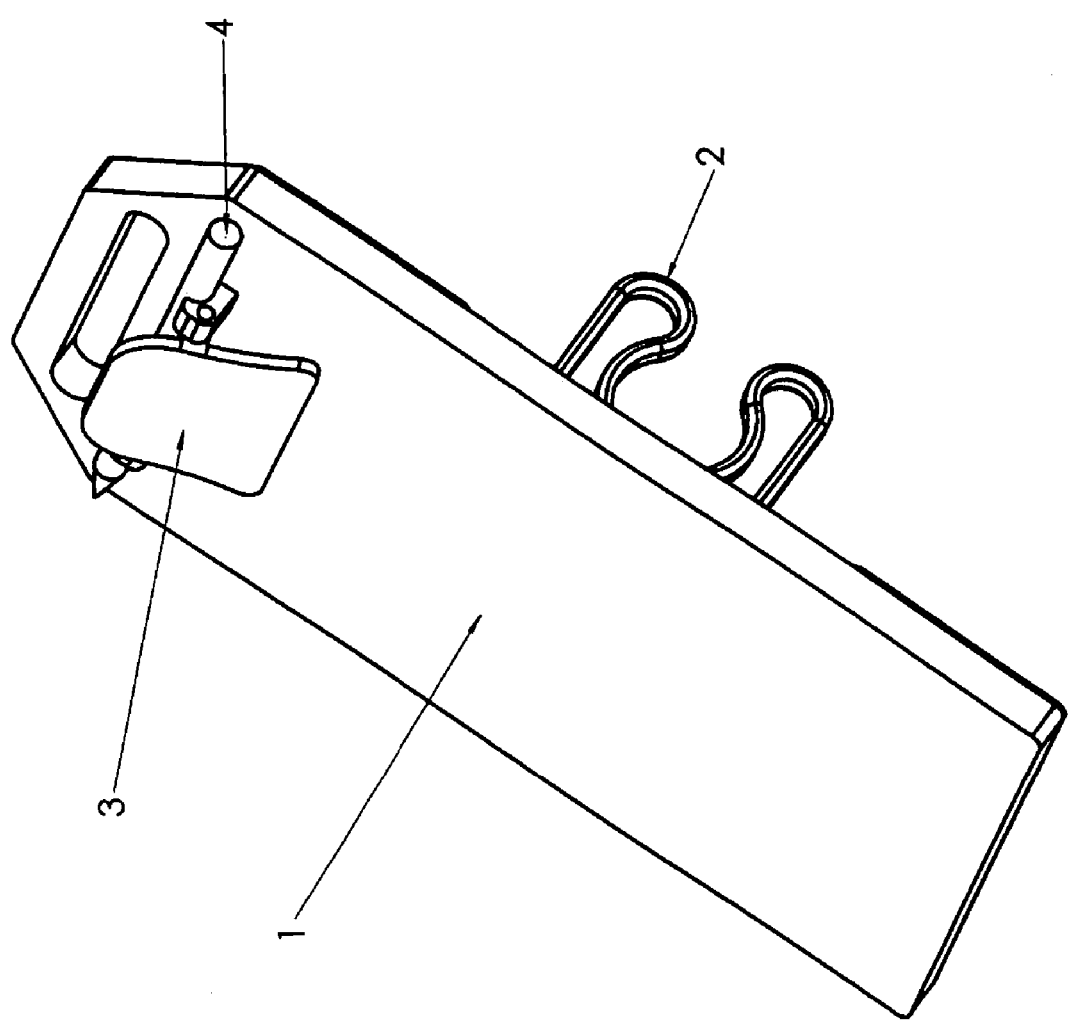
FIG. 1 is, in front perspective view, one assembled embodiment of the present invention showing clipboard and mounting means.
Figure 2:
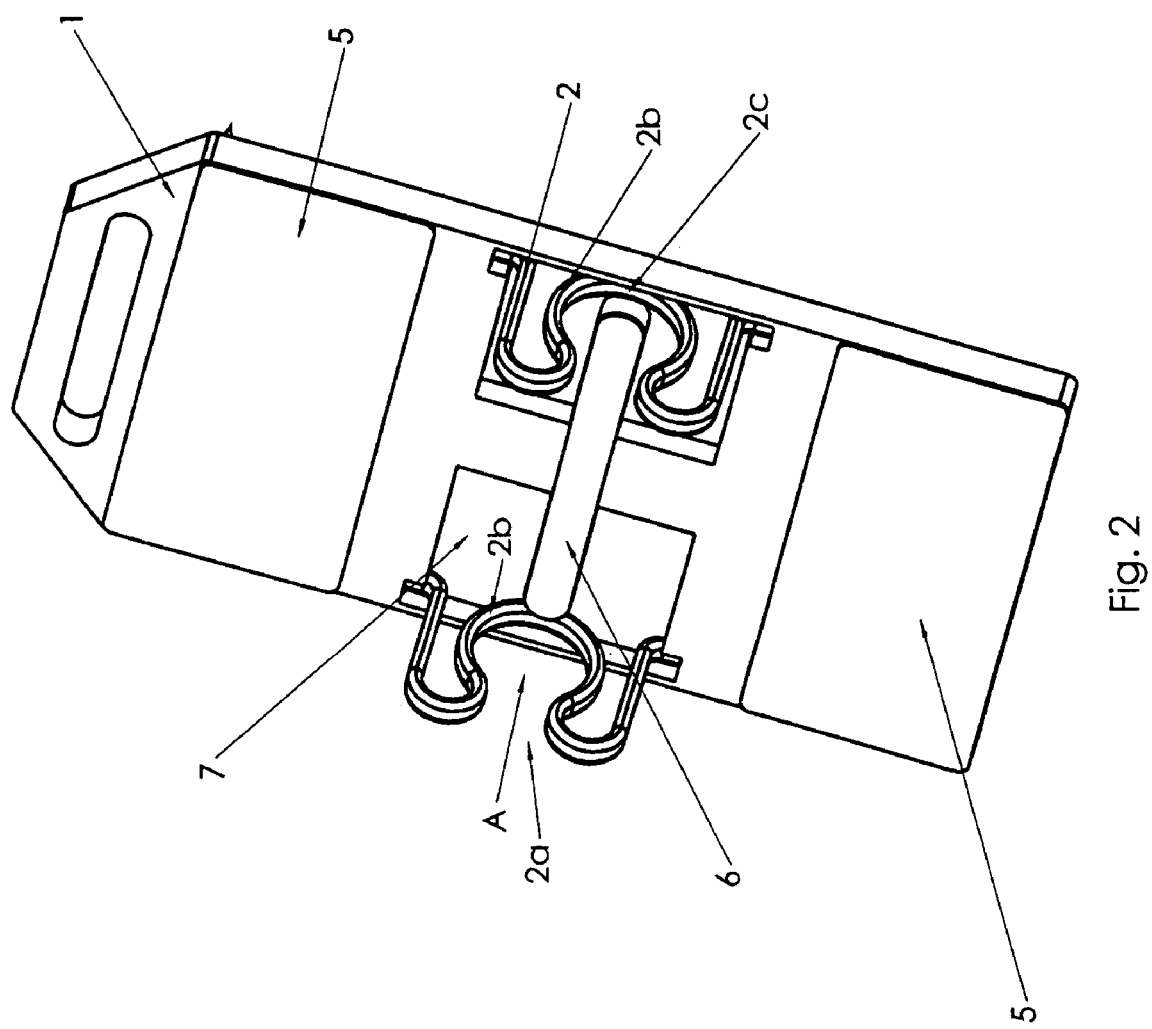
FIG. 2 is, in rear perspective view, one assembled embodiment of the present invention showing clipboard and mounting means with mounting means extended or flipped out for mounting on a shopping cart handle.

As seen in FIGS. 1 and 2, one embodiment of the present invention includes a writing board 1 (clipboard), the mounting assembly 2, resilient tactile sheet 6 on the surface that engages shopping cart handles, flat tactile or magnetic sheet 5 on the surface that engages flat surfaces such as the outer walls of refrigerators, a means to releasably "clip" 3 a paper note or notepad to the writing board, and a mount for a writing implement such as a pen or pencil 4.

Figure 2A:
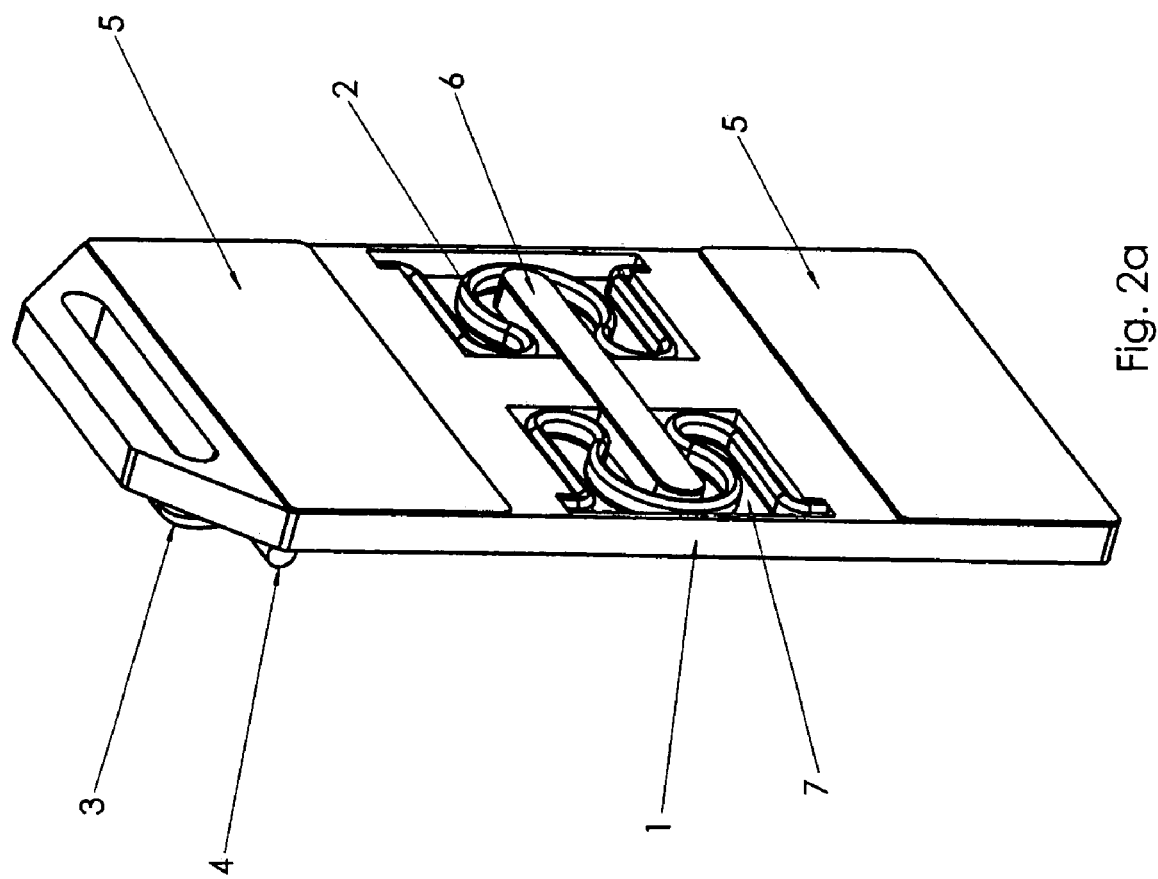
FIG. 2a is, in rear perspective view, one assembled embodiment of the present invention showing clipboard and mounting means, with mounting means stowed or flipped down for transport or mounting on a refrigerator door.
Figure 3:
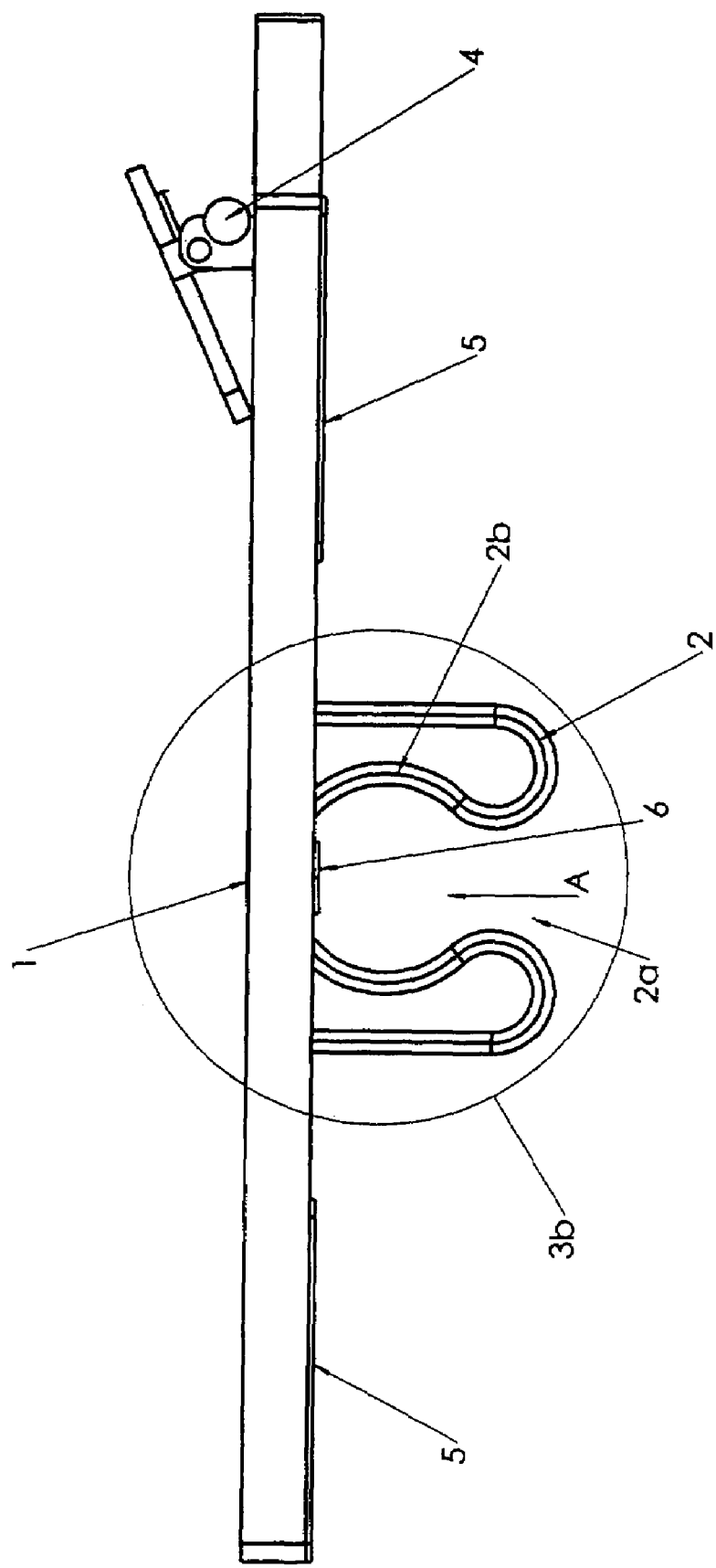
FIG. 3 is, in right side view, one assembled embodiment of the present invention showing clipboard and mounting means, with mounting means extended or flipped out for mounting on a shopping cart handle.
Figure 3A:
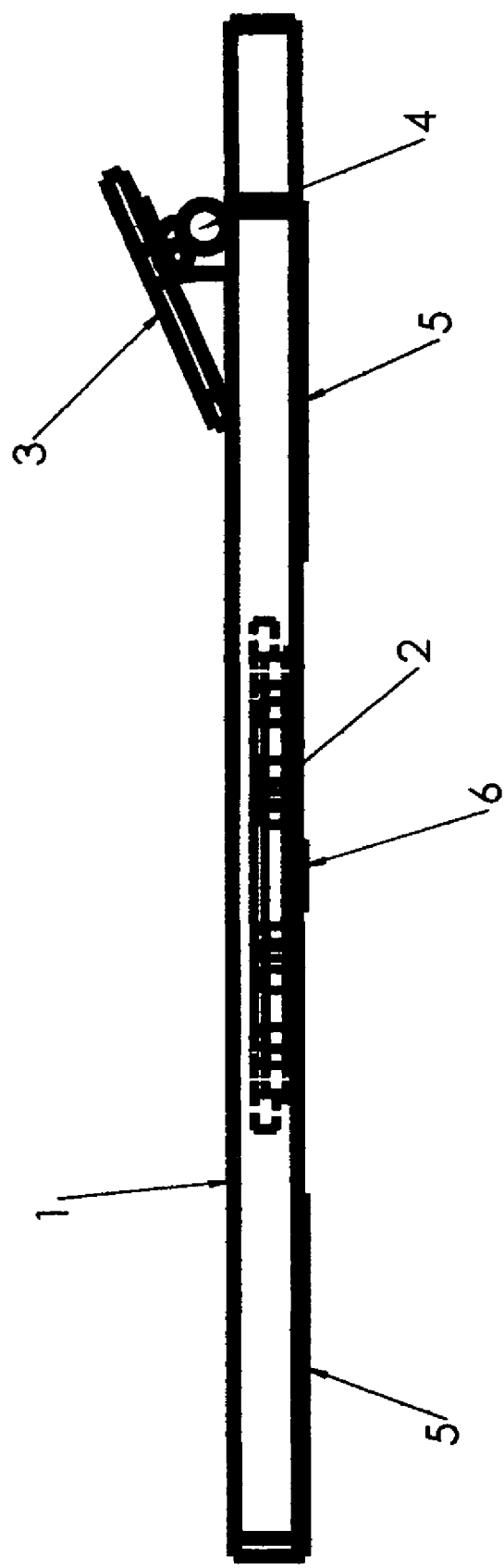
FIG. 3a is, in right side view, one assembled embodiment of the present invention showing clipboard and mounting means, with mounting means stowed or flipped down for transport or mounting on a refrigerator door.

Clipboard 1 has a smooth writing surface on its upper side, and a contoured surface on the opposite bottom side. The contoured surface includes a recess 7 for the mounting assembly 2 to fold into as shown in FIGS. 2a and 3a.

Figure 3B:
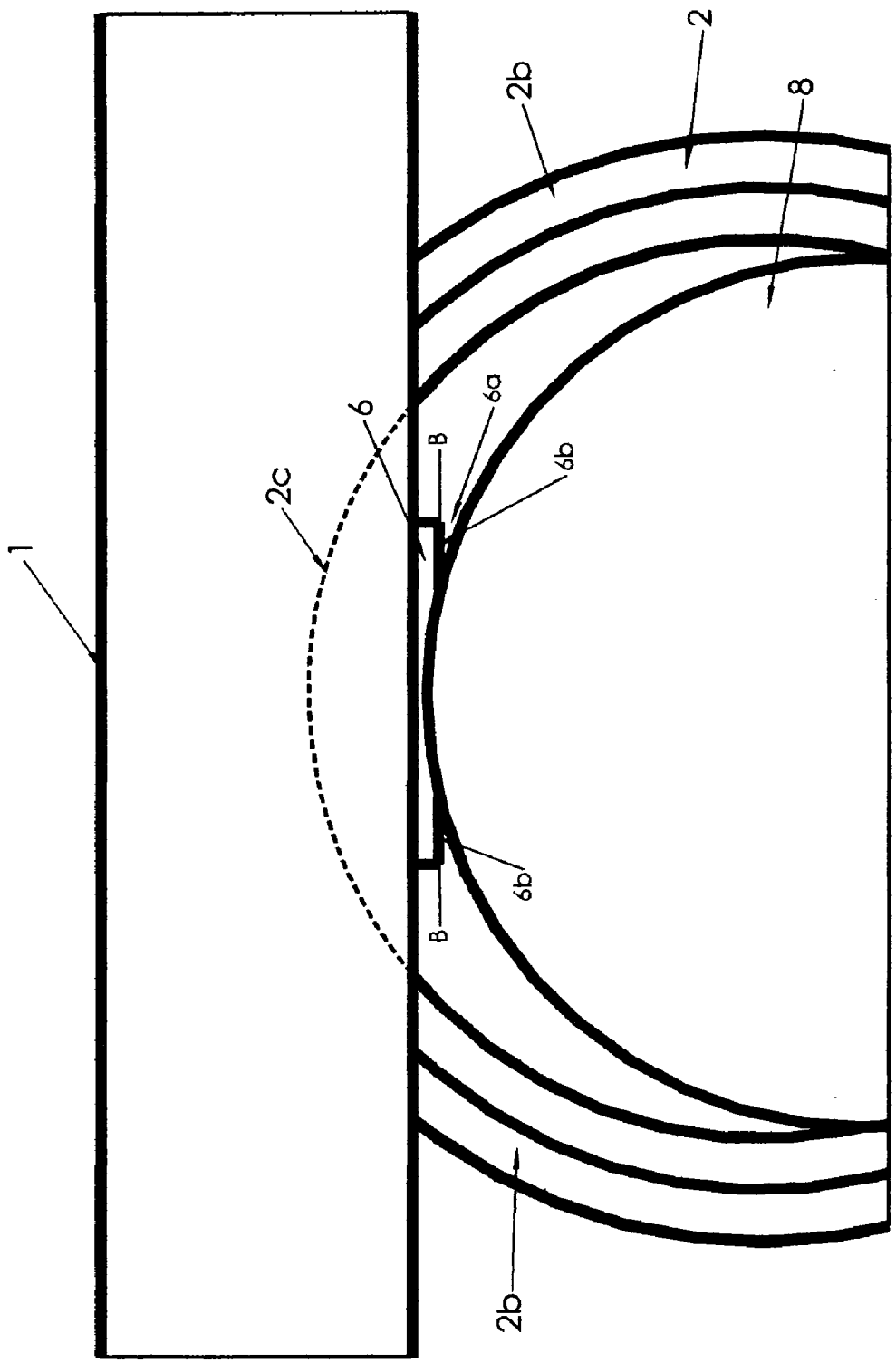
FIG. 3b is an enlarged portion of FIG. 3.

As shown in FIG. 4, one embodiment of the mounting assembly includes a pair of conformal resilient loops 2, which engage by resiliently deforming so as to pass the shopping cart handle 8 through the openings 2a into the conformal body 2b of the loops, forcing the handle 8 in direction A against the resilient tactile sheet 6. The frictional force between the conformal loops 2 and the handle 8 once snugly mounted within the body 2b of each loop, and the friction force between the resilient tactile sheet 6 and the handle 8 at their interface 6a wherealong sheet 6 slightly deforms to follow the curvature of handle 8, as best seen in FIG. 3b, impedes unintentional rotation of the clipboard 1 about the handle 8. Consequently, in the preferred embodiment, when loops 2 are deployed in their open position orthogonal to the clipboard as in FIGS. 2 and 3, the vertices 2c of each loop lie behind a plane B containing the non-deformed contact surfaces 6b of sheet 6, that is, so that at least the contact surfaces extend into the aperture defined by the loop bodies 2b.

Figure 5:
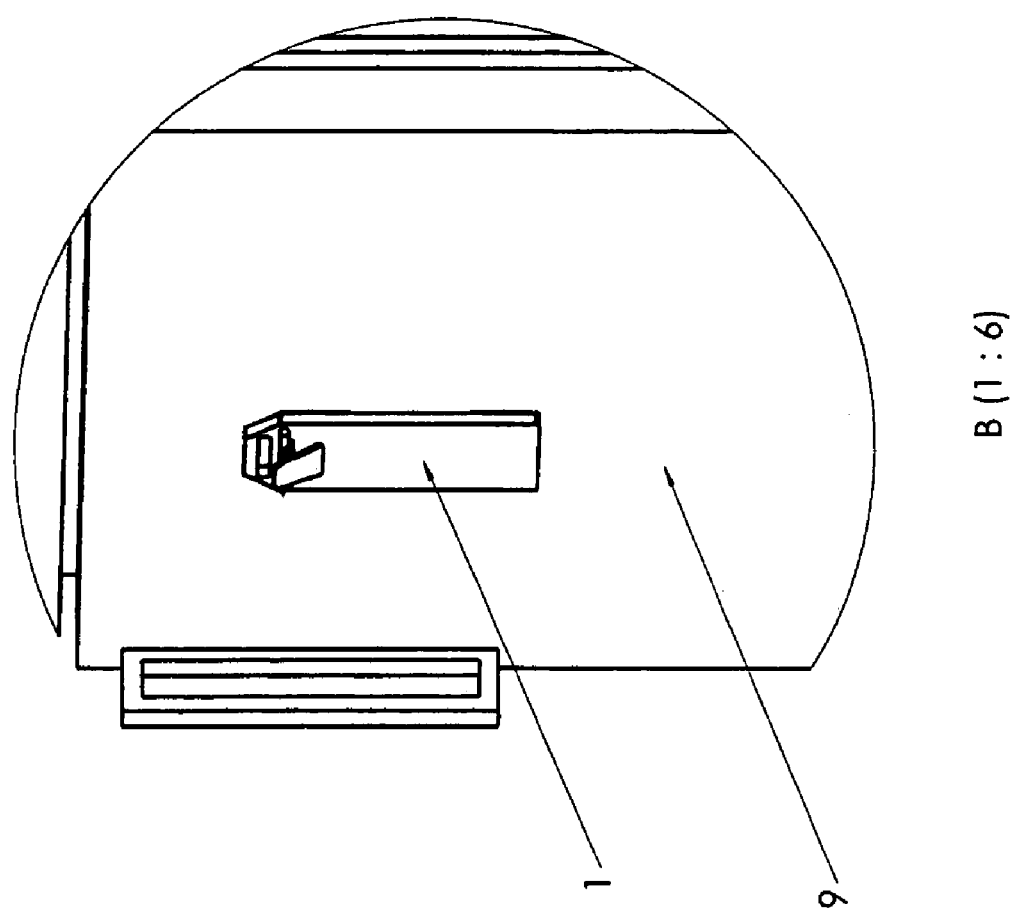
FIG. 5 is, in close-up front perspective view, one embodiment of the present invention mounted on a domestic refrigerator door.
Figure 6:
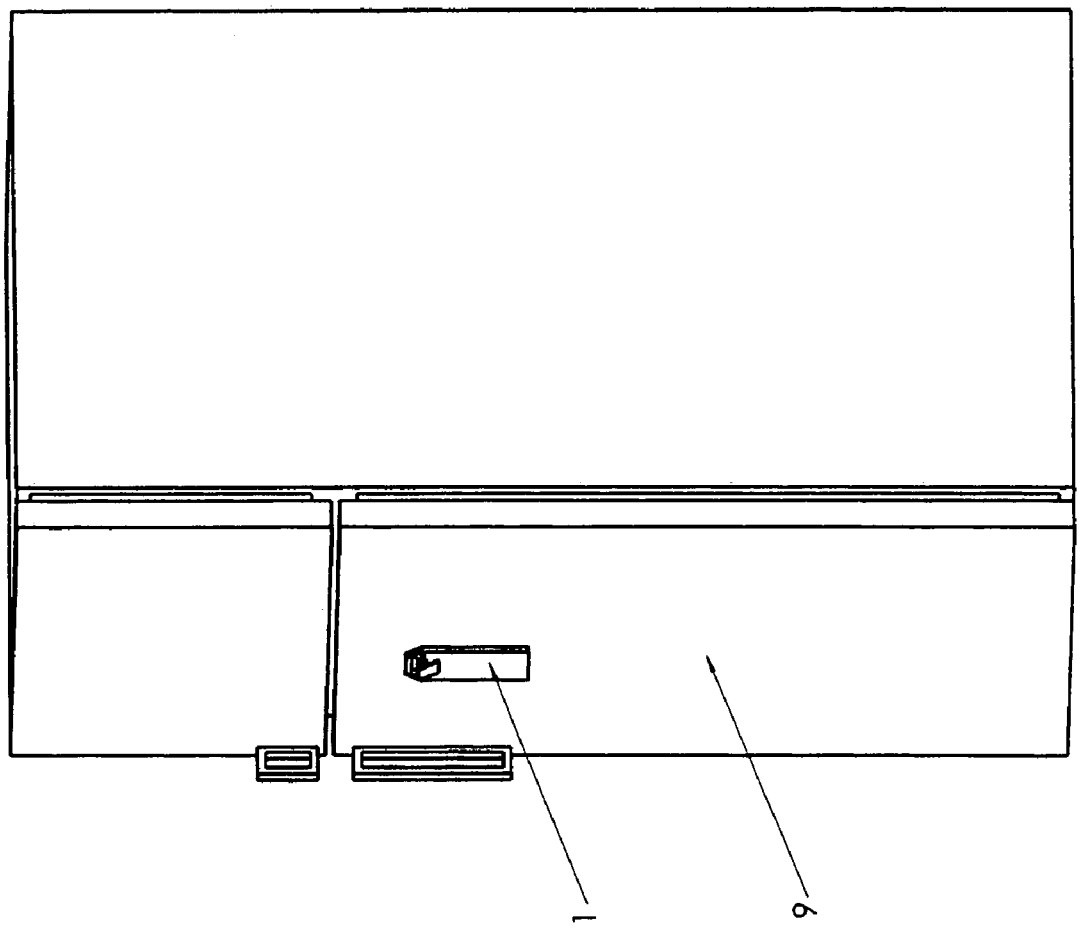
FIG. 6 is, in front perspective view, one embodiment of the present invention mounted on a domestic refrigerator door.

FIGS. 5 & 6 shows one embodiment of the present invention mounted onto the door of a refrigerator.

The present invention can be releasably fastened to a wall or refrigerator, and can be removed and transported to the store where it can be releasably fastened to the handle 8 of a shopping cart or basket. This device consists of a clip board with the bottom surface profiled to allow flip out mounts to be recessed when stowed. The two flip-out mounts are mounted to the underside of the clipboard near each side edge of the clipboard. The spring loaded force of the loop shaped mounts, combined with the frictional force between the resilient tactile material of sheet 6 and the shopping cart handle 8 limits the rotation of the clip board about the shopping cart handle. The shopping list organizer can be attached to a shopping cart handle by sliding the mounts orthogonally over the handle until the handle is snugly secured. To release the shopping list holder the clipboard is simply pulled away from the handle until the device is removed.

The resilient tactile material of sheet 6 may be made of a silicon polymer such as the Octapad™ commercially available from Hiscoco Innovations Inc. of Kelowna, British Columbia, Canada.

The mounting means may be used in other applications where it is desirious to releasably mount a board, box, or device to an elongated member such as but not limited to the handle of a shopping cart.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A shopping list writing tablet and mounting system comprising:
   a rigid substantially planar member sized to support a shopping list when the shopping list is mounted thereon so that the shopping list may be written upon by a user,
   means for releasably mounting the shopping list on a first surface of said planar member,
   means mounted on a second side of said planar member, opposite said first side, for releasably mounting said planar member on a flat substrate, and wherein said means for releasably mounting said planar member on a flat substrate mounts said planar member on said flat substrate in a planar state so that the shopping list may be written upon by a user, at least one clip hingedly mounted by a hinge means to said second side of said planar member for rotation about said hinge between a closed position substantially flush against said second side of said planar member and an open position substantially orthogonal to said second side of said planar member wherein, in said open position, said clip is disposed for releasably mounting onto an elongate handle, and wherein said means for releasably mounting said planar member on a flat substrate is substantially planar and has an exterior surface opposite to said second side of said planar member and wherein in said closed position said clip is retracted adjacent said second side of said planar member in said planar state and is recessed behind said exterior surface so as to not interfere with operation of said means for releasably mounting said planar member on a flat substrate, each clip of said at least one clip having at least one arm defining an aperture and an opening, said opening cooperating with said aperture for passing of the handle through said opening into said aperture, said aperture sized to snugly retain the handle journalled in said aperture, a friction member mounted in cooperation with said aperture when said clip is in said open position so as to bear said friction member against and frictionally engage the handle when the handle is releasably mounted in said aperture.

2. The device of claim 1 wherein said means for releasably mounting the shopping list is a resilient clip mounted to said first side of said planar member.

3. The device of claim 1 wherein said means for releasably mounting said planar member on a flat substrate includes at least one magnet.

4. The device of claim 3 wherein said at least one magnet includes a pair of magnets mounted spaced apart on opposite ends of said second side of said planar member.

5. The device of claim 4 wherein said at least one clip is hingedly mounted between said pair of magnets.

6. The device of claim 5 wherein said at least one clip includes a pair of clips mounted so that, in their open position, said apertures on said pair of clips are aligned to accept the handle simultaneously mounted in both said apertures.

7. The device of claim 6 wherein said planar member is elongate between said opposite ends and wherein said handle, when mounted in said pair of apertures, extends laterally of said planar member.

8. The device of claim 1 wherein said at least one clip includes a pair of clips mounted so that, in their open position, said apertures on said pair of clips are aligned to accept the handle simultaneously mounted in both said apertures.

9. The device of claim 8 wherein said planar member is elongate between said opposite ends and wherein said handle, when mounted in said pair of apertures, extends laterally of said planar member.

10. The device of claim 1 wherein said at least one clip is a resilient clip.

11. The device of claim 10 wherein said resilient clip has a pair of opposed facing resilient book-arms defining said aperture therebetween.

12. The device of claim 1 wherein said friction member is mounted to said second side of said planar member so as to dispose at least a frictional bearing surface of said friction member into alignment with said aperture.

13. The device of claim 12 wherein said aperture has a vertex adjacent said second side of said planar member when said at least one clip is in said open position, and wherein said frictional bearing surface is adjacent said vertex so as to be disposed inwardly into said aperture so that the handle when mounted in said aperture contacts said frictional bearing surface and not said vertex.

14. The device of claim 1 wherein said friction member is resilient.

15. The device of claim 8 wherein said friction member extends between said pair of clips.

16. The device of claim 15 wherein said friction member is resilient.

17. The device of claim 1 wherein said second side of said planar member has recesses therein, formed so that said at least one clip when in said closed position lies in said recesses.

18. The device of claim 17 wherein in said closed position said at least one clip is substantially contained within said recesses in said second side of said planar member.

19. The device of claim 8 wherein said hinge means provide for folding of said pair of clips inwardly from adjacent edges of said second side of said planar member.

20. The device of claim 19 wherein said friction member is mounted to said second side of said planar member and extends into said apertures when said pair of clips are in said closed position.

* * * * *